UNITED STATES PATENT OFFICE.

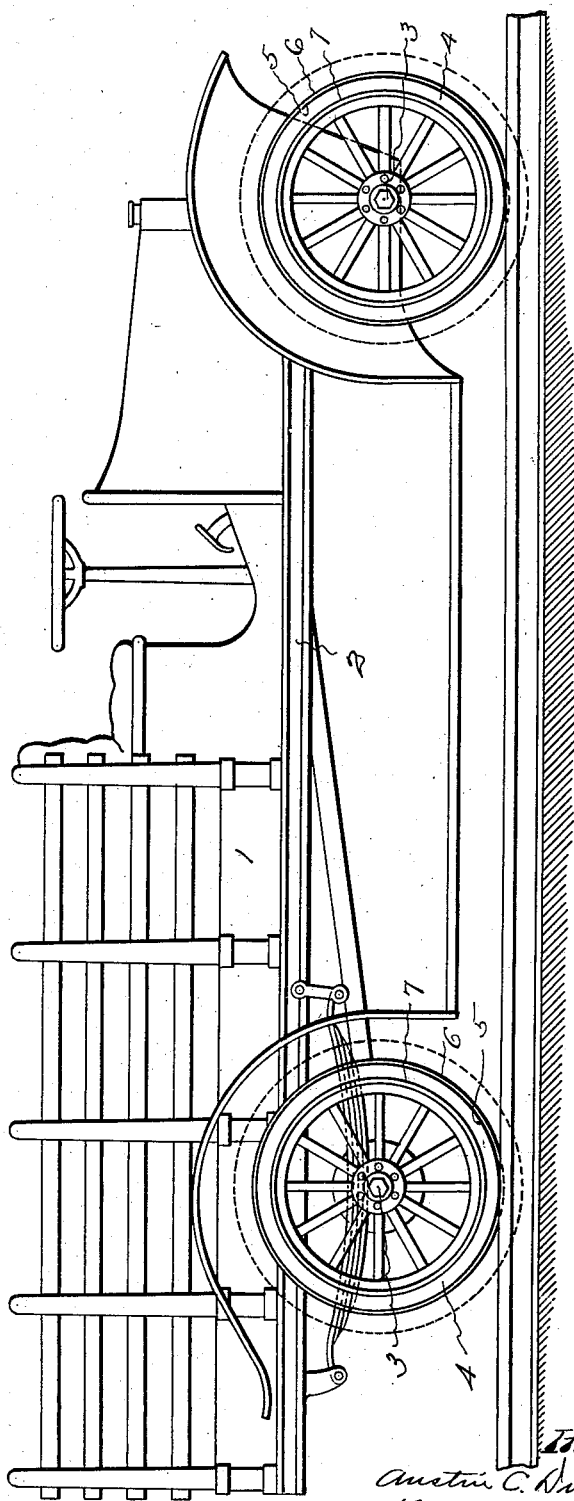

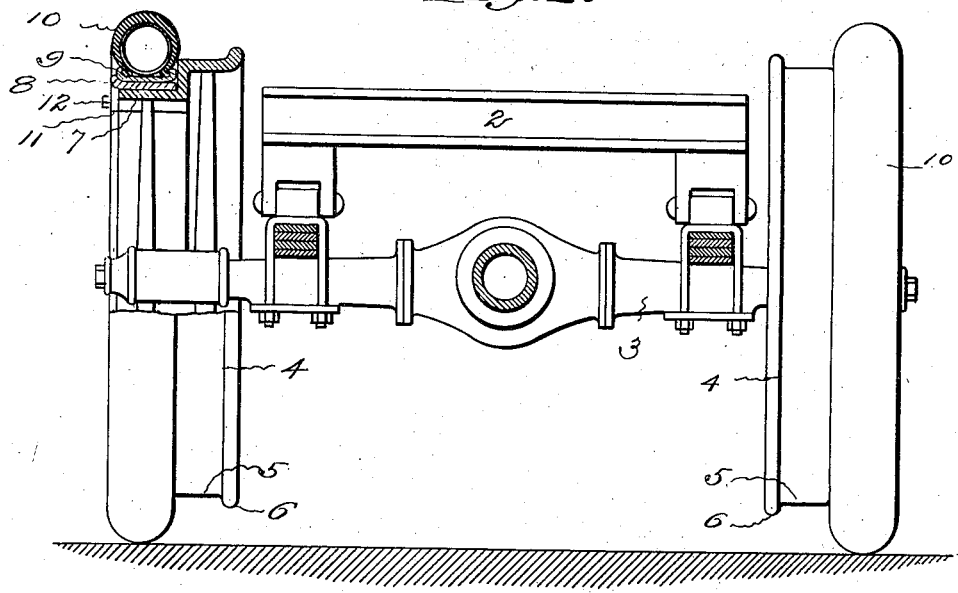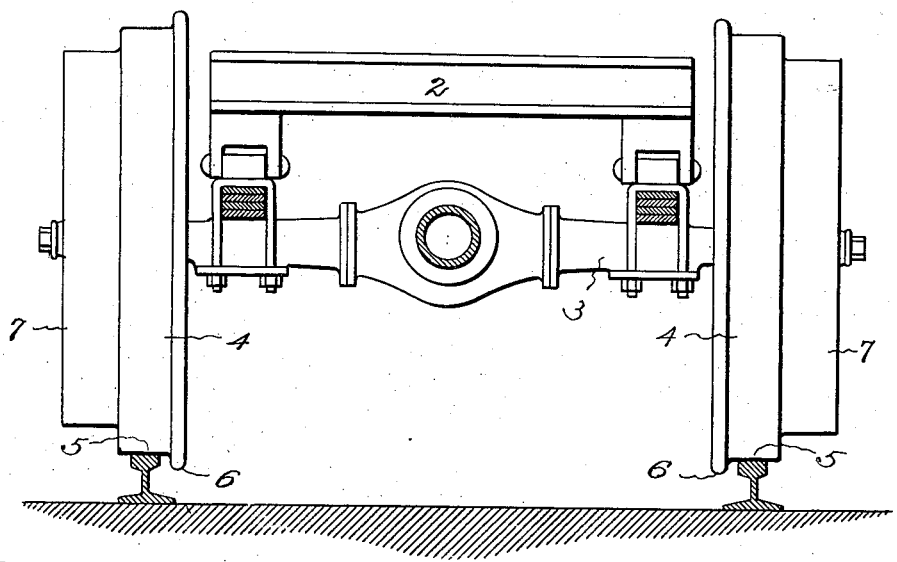

AUSTIN C. DUNHAM, OF HARTFORD, CONNECTICUT.

AUTOMOBILE-WHEEL.

1,150,018.  Specification of Letters Patent.  Patented Aug. 17, 1915.

Application filed June 13, 1914. Serial No. 844,870.

*To all whom it may concern:*

Be it known that I, AUSTIN C. DUNHAM, a citizen of the United States, residing at Hartford, in the county of Hartford and State of Connecticut, have invented a new and useful Improvement in Automobile-Wheels, of which the following is a specification.

This invention relates to the construction of the wheels of an automobile designed to be driven on a highway or on the rails of a track according to the exigencies of the situation, and is particularly serviceable for vehicles provided for carrying freight and express matter between communities at a distance from each other, although it is, of course, useful for other purposes.

Freight and express matter, as well as passengers, are carried on interurban and suburban lines in cars which run on metallic tracks for the reason that higher speed can be attained with smaller expenditure of energy and fuel and less wear on the parts, than when the vehicles are run on highway roads. This method of transportation, however, necessitates the collecting of the parcels of merchandise or the gathering of passengers to be transported, from various localities and carrying them over a highway to a station or the line where they are transferred from the collecting vehicle to the cars on the track, then at the desired locality along or at the end of the line unloading and transporting them over a highway to the place of delivery.

The object of the invention is to so construct an automobile running gear that the vehicle can be used on an ordinary highway for collecting freight, express or passengers from any locality, and then run on the rails of a suburban or interurban track to the point desired at which it is run off from the rails onto the highway and the freight, express or passengers delivered at the desired localities, thus utilizing the advantages of track transportation when feasible and avoiding rehandling or transferring of the goods or passengers at both the points of starting and ending of the track run. This eliminates the time and labor incident to two rehandlings, also the danger of breakage incident to the transfer of freight, and effects the collection and transportations of goods and passengers with convenience to the patrons and a saving of time, fuel and wear both to the vehicle and to the highway. To accomplish this object the vehicle is provided with flanged wheels of the usual type designed to run on the ordinary rails of the track in common use, which wheels on the outside have hubs upon which the common form of pneumatic or cushion tires, usually applied to automobiles or trucks, can be quickly placed or removed so that when the vehicle is to be used on the highway it will run on the yielding treads with the rail flanges lifted so that they will not touch the surface of the ground.

Figure 1 of the accompanying drawings which illustrate the invention represents a side view of a freight or express truck provided with a running gear which embodies this invention. Fig. 2 shows on larger scales a pair of the wheels of this vehicle arranged for running on a highway. Fig. 3 shows a pair of the wheels arranged for running on rails.

The body 1 of the vehicle may be of any common form or style designed for passengers or goods and it may be provided with any type of engine or motor, either gasolene or electric. The frame 2 which supports the body may be of the usual construction and the axles 3 are of common form and are connected with the driving mechanism and steering gear in the usual way.

Each wheel 4 has a tread surface 5 designed to run on a rail and on the inside has a flange 6 arranged as usual to keep the wheel on the rail. This tread and flange are of the form approved for use on the common traction rail. Extending outward from each wheel is a felly 7, which is of less diameter than the rail tread of the wheel. This felly is shaped to receive a flanged band 8 holding a rim 9 containing a common form of cushion or pneumatic tire 10. The band may be fastened on to the felly by any of the common means usually employed for fastening on the rim of an automobile wheel, such as the clips 11 and bolts 12.

At the end of the track run or at other convenient places the rails may be slightly raised or depression may be made at the side of the rails so that the highway wheels may be easily put on or removed as the case may be. By this very simple means the vehicle can be quickly equipped so as to have the freedom or independence of a highway run or the speed and economy of a track run.

The invention claimed is:

A motor vehicle wheel having a track tread, a flange on the inside of said tread of larger diameter than said tread, a laterally projecting felly of smaller diameter than said tread carried by said wheel, and a yielding tire of larger diameter than said flange detachably mounted on said felly.

AUSTIN C. DUNHAM.

Witnesses:
E. S. HUTTING,
JOHN E. LYNCH.